United States Patent
Furihata et al.

[11] Patent Number: 5,556,083
[45] Date of Patent: Sep. 17, 1996

[54] TORSION BAR WITH VARIABLE SPRING CONSTANT

[75] Inventors: Kenichi Furihata; Atsushi Takahashi, both of Fujisawa, Japan

[73] Assignee: Isuzu Motors Limited, Tokyo, Japan

[21] Appl. No.: 416,274

[22] Filed: Apr. 4, 1995

[30] Foreign Application Priority Data

Apr. 4, 1994 [JP] Japan .................... 6-065993

[51] Int. Cl.⁶ ..................................... F16F 1/14
[52] U.S. Cl. .......................... 267/277; 280/721
[58] Field of Search .................. 188/267, 299; 267/273, 274, 276, 277, 140.14, 140.15, 154; 280/707, 721, 723

[56] References Cited

U.S. PATENT DOCUMENTS

| | | | |
|---|---|---|---|
| 4,765,600 | 8/1988 | Hartel | 280/707 X |
| 4,773,632 | 9/1988 | Hartel | 267/152 X |
| 4,790,522 | 12/1988 | Drutchas | 280/707 X |
| 4,819,772 | 4/1989 | Rubel | 280/707 X |
| 4,869,476 | 9/1989 | Shtarkman | 267/140.14 |
| 4,942,947 | 7/1990 | Shtarkman | 267/140.11 X |
| 5,174,552 | 12/1992 | Hodgson et al. | 267/136 X |
| 5,267,633 | 12/1993 | Endo et al. | 188/267 |
| 5,354,488 | 10/1994 | Shtarkman et al. | 267/140.14 X |

*Primary Examiner*—Mark T. Le
*Assistant Examiner*—Peter M. Poon

[57] ABSTRACT

A plurality of hollow torsion-bar members are arranged coaxially, and ERF (Electro Rheological Fluid), which increases its viscosity and holds the hollow torsion-bar members together as a unit when a certain voltage is applied, is loaded into the clearances between the hollow torsion-bar members. Electric terminals are installed at one end of each hollow torsion-bar member so that voltage is applied to the hollow torsion-bar members.

10 Claims, 6 Drawing Sheets

| Case | SW 1 | SW 2 | SW 3 |
|------|------|------|------|
| Case 1 | OFF | OFF | OFF |
| Case 2 | ON | OFF | OFF |
| Case 3 | ON | ON | OFF |
| Case 4 | ON | ON | ON |
FIG. 2
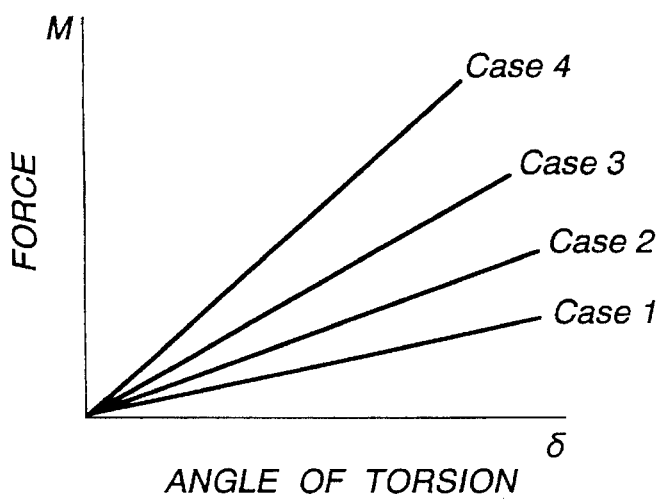
FIG. 3
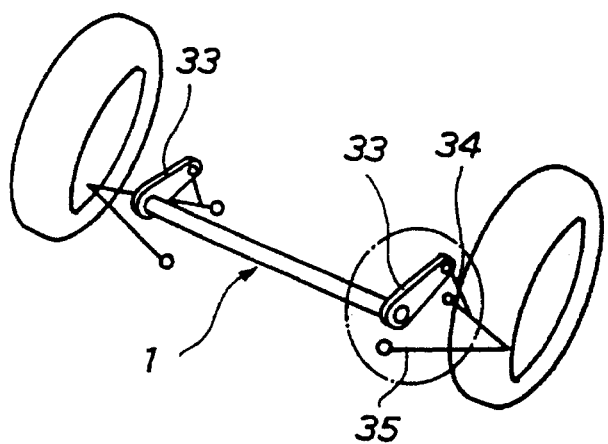
FIG. 4

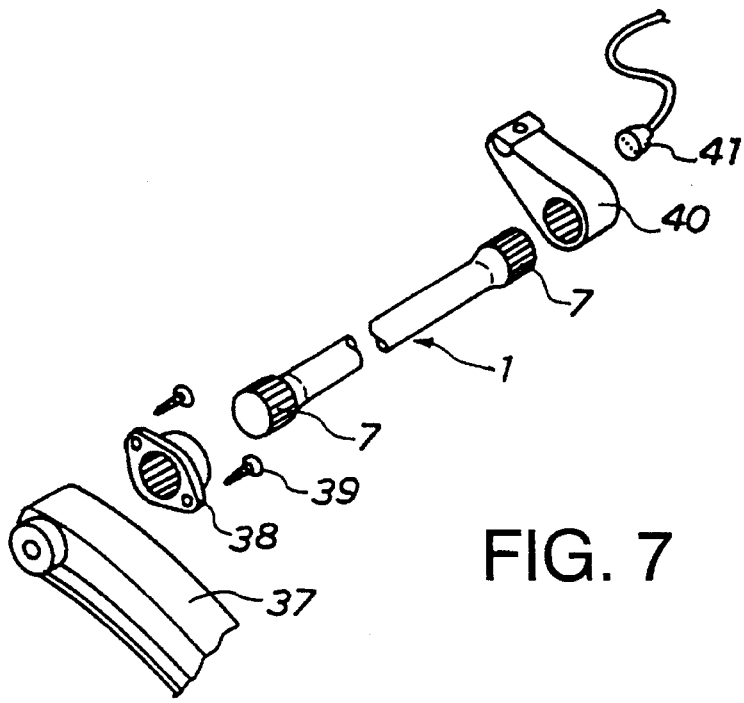
FIG. 7
(PRIOR ART)
FIG. 8
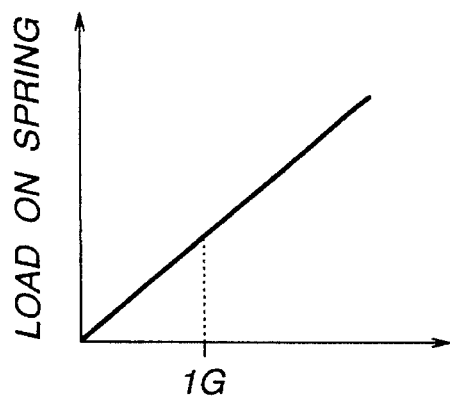
FIG. 9
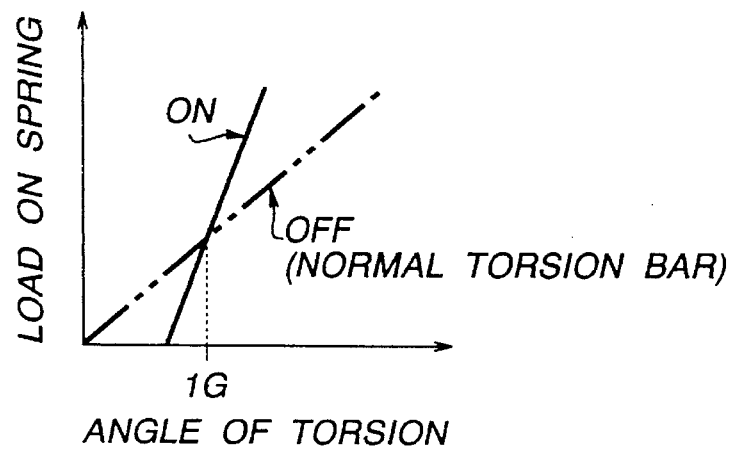

TORSION BAR WITH VARIABLE SPRING CONSTANT

BACKGROUND OF THE INVENTION

1. Technical Field

This invention relates to a torsion bar with variable spring constant.

2. Background Art

A torsion bar with variable spring constant is known in the art. One example is disclosed in Japanese Utility Model Application, Publication No. 62-16505, which is schematically illustrated in FIG. 13 of the accompanying drawings. As shown in FIG. 13, the torsion bar 'a' has a first bar member 'b' and a second hollow bar member 'c' coaxially extending over the first bar member until a joint portion 'd'. These bar members 'a' and 'b' are fixedly connected to each other at the joint portion 'd'. The other ends of the bar members 'b' and 'c' are connected with each other via a slidable coupler 'e'. The coupler 'e' can slide along the axis of the bar member 'b' in the bar member 'c'. In this arrangement, pulling a cable 'f' along the axis of the bar member 'b' changes a "torsion length" L which determines how much the bar members can twist or rotate about their own axes. More specifically, as the slidable element 'e' moves toward the fixed joint 'd', that part of the hollow element 'c' which is right to the element 'e' in FIG. 13 does not work as a torsion bar element so that the total stiffness of the torsion bar 'a' is reduced. When the slidable element 'e' reaches the fixed joint 'd', only the bar member 'b' works as a torsion element. In this manner, the spring constant of the torsion bar 'a' is varied by manipulation of the cable 'f'.

This prior art arrangement, however, cannot achieve great change in the spring constant because the spring constant or bar rigidity is changed by means of the coupler 'e'. The spring constant can only be changed from a value representing the spring constant of the bar member 'b' at minimum (when the coupler 'e' takes the leftmost position in FIG. 13) to another value representing the total or combined spring constant of both bar members at maximum (when the coupler 'e' takes the rightmost position). Further, the configuration has many mechanical components and may therefore be more affected by aging than an electrically controlled arrangement. In addition, if it is used as a stabilizer bar, as shown in FIG. 13, a great amount of load will be applied onto the joint portion 'e'. Also, it may be very difficult to mount the torsion bar on an automobile body, considering the complexity of the cable arrangement, because the coupler 'e' is designed to be pulled via the cable 'f'.

Another torsion bar with variable spring constant is disclosed in Japanese Patent Application, Publication No. 1-278815, which is schematically illustrated in FIG. 14 of the accompanying drawings. One end of the torsion bar 'g' with variable spring constant is fixed to a suspension arm 'h' and the other end is fixed to a bracket 'i', which is mounted to the body frame. Attached at an intermediate portion 'j' is a support mechanism 'k' to prevent or allow torsion (twisting motion) of the torsion bar 'g' relative to the body frame. In this configuration, fixing the intermediate portion 'j' of the bar 'g' by means of the support mechanism 'k' reduces a substantial torsion length from L2 to L1 and thus varies the spring constant, while releasing the intermediate portion 'j' extends the virtual twisting length of the bar 'g' to L2 and thus decreases the spring constant.

The above-described arrangement was intended to be used as a torsion bar for automobile suspensions. However, the total length of the torsion bar 'g' becomes too long to be mounted onto the body frame if a softer suspension is desired. Also, it can only change the spring constant between two values L1 and L2, i.e., higher and lower ones. If more than two variable spring constants should be realized, more than one support mechanisms 'k' must be provided on the bar 'g'. In this case, however, the number of manufacturing processes increases because each support mechanism 'k' must be separately mounted on the body frame. In addition, each support mechanism applies a vertical load to the body frame, increasing the number of input points of the vertical loads applied to the body frame. Thus, time-consuming structural analysis must be conducted to find out how much loads act at the respective input points and whether the strength of the body frame is sufficient.

SUMMARY OF THE INVENTION

Taking the aforementioned circumstances into consideration, an object of this invention is to provide a more compact torsion bar with spring constant that can vary over a wider range.

In achieving the object in one preferred embodiment, we employ a plurality of hollow torsion-bar members of different diameter, arrange the hollow bar members coaxially, and fill each and every clearance between adjacent hollow members with ERF (Electro Rheological Fluid) which increases its viscosity upon application of electricity to unite the bar members. Also, we install an electric terminal on one end of each bar member in order to apply electricity to itself and its adjacent member(s).

Upon applying a certain voltage to adjacent hollow bar members, these members adhere to each other by virtue of the ERF filling the clearance between them. Thus, the spring constant of the torsion bar increases. It is therefore possible to control the spring constant over a great range in a finely tuned manner by appropriately selecting the electric terminals to which a voltage is applied.

BRIEF DESCRIPTION OF THE DRAWINGS

FIG. 2 is a table showing on/off control via switches SW1, SW2 and SW3 shown in FIG. 1;

FIG. 3 is a chart showing the changes in spring constant of the torsion bar illustrated in FIG. 1;

FIG. 4 is an illustration of the torsion bar used as a stabilizer bar;

FIG. 7 is an enlarged and exploded view of the portion indicated by the broken-line circle in FIG. 6;

FIG. 8 is a chart showing the characteristics of a normal torsion bar;

FIG. 9 is a chart showing the characteristics of a torsion bar of this embodiment of this invention;

DETAILED DESCRIPTION OF THE PREFERRED EMBODIMENTS

In the following description, preferred embodiments of the present invention will be described in reference to the attached drawings.

Figure 1:
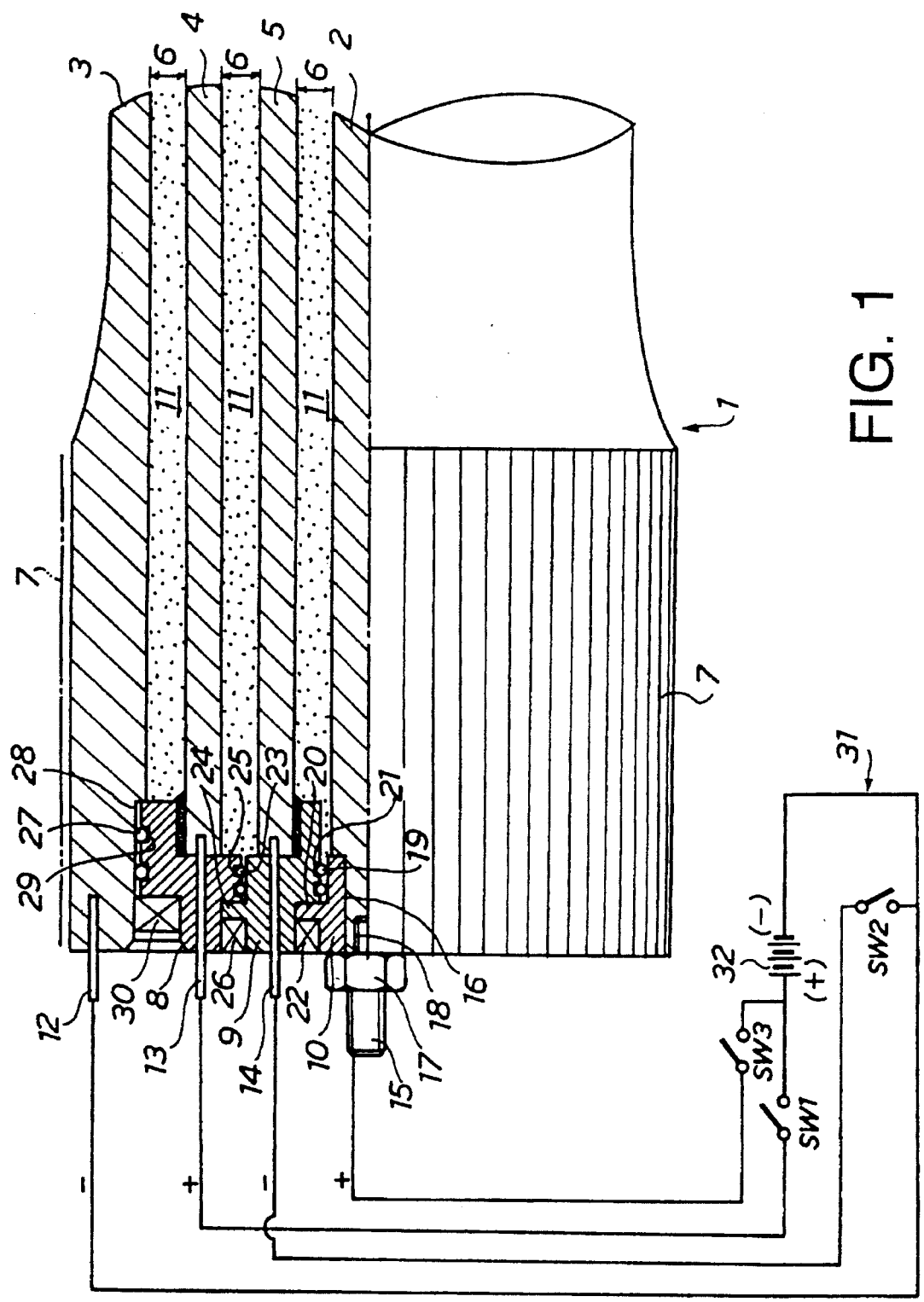
FIG. 1 is a fragmentary sectional view of a torsion bar with variable spring constant showing one preferred embodiment of this invention.

FIG. 1 is a fragmentary sectional view of a torsion bar 1 with variable spring constant. As shown in the figure, first, second and third hollow torsion-bar members 3, 4 and 5 with respectively different diameters are coaxially arranged at a certain clearance 6 around a solid torsion-bar member 2, which is a center piece of the torsion bar 1. It should be noted that the bar member 2 is a solid element in the illustrated embodiment but it may be a fourth hollow torsion-bar member. In this case, the torsion spring constant will be slightly smaller.

The first outermost torsion-bar member 3 has splines 7 on its both ends. Each spline portion 7 is grasped by separate members to provide twisting motion to the torsion bar 1. The second hollow torsion-bar member 4 is placed inside the first hollow member 3. The third hollow member 5 is placed inside the second hollow member 4. The solid member 2 is placed inside the third hollow member 5.

These hollow bar members 3, 4, 5 and 2 are supported by and spaced from each other by first, second and third insulating seals 8, 9 and 10 respectively with the clearance 6 such that they rotate relative to each other. Each clearance 6 is filled with ERF (Electro Rheological Fluid) 11, which increases its viscosity when electricity is applied and holds adjacent hollow bar members together as a unit. Installed at the end of the member bars 3, 4, 5 and 2 are terminals 12, 13, 14 and 15 to apply electricity to the electro rheological fluid 11.

The first, second and third insulation seals 8, 9 and 10 have self-lubricating capability to support the bar members 2, 3, 4 and 5 in a rotatable manner, and are made from a rigid material in order to maintain the clearance 6 while the bar members are rotating. For instance, nylon 66 or polyacetal is typically used as such a material. The bar members 2, 3, 4 and 5 are of spring steel which can act as a torsion spring and are of conductive material to allow application of voltage to the ERF 11.

In the following description, the torsion bar 1 with variable spring constant will be described more in detail.

At both ends of the solid bar member 2, there are cut-off portions or reduced portions 16. The ring-shaped insulation seal 10 is tightly fitted over the reduced portion 16. This third insulation seal 10 is fixed by a bolt 17 so that it does not fall off. The bolt 17 is screwed into a hole 18 tapped in the end surface of the solid member 2. The bolt 17 also serves as an electric terminal 15.

An O-ring 19 tightly fits the second ring-shaped insulation seal 9 which is adhered to the inner circumference of the third hollow bar member 5, to the outer circumference of the third insulation seal 10. The second insulation seal 9 supports the third hollow bar member 5 in a rotatable manner and coaxially, maintaining the clearance 6 to the solid bar member 2. The second insulation seal 9 is stopped by a flange portion 20 of the third insulation seal 10 so that its falling off from the torsion bar 1 is prevented. The O-ring 19 is placed in a groove 21 formed in the inside circumference of the second insulation seal 9, and prevents leakage of the ERF 11 filling the clearance 6 between the bar members 2 and 5. A dust seal 22 is installed between the second insulation seal 9 and the third seal 10.

An O-ring 23 tightly fits the first ring-shaped insulation seal 8, which is adhered to the outer circumference of the second hollow bar member 4, to the outer circumference of the second insulation seal 9. The first insulation seal 8 supports the second hollow bar member 4 in a rotatable manner and coaxially, maintaining the clearance 6 against the third hollow bar member 5. The first insulation seal 8 is stopped at a flange portion 24 of the second insulation seal 9 so that it is prevented from falling off from the torsion bar. The O-ring 23 is firmly seated in a groove 25 formed in the inside circumference of the first insulation seal 8 and prevents the ERF 11 filled between the bar members 4 and 5 from leaking. Another dust seal 26 is installed between the first and second insulation seals 8 and 9.

An O-ring 27 tightly fits the first hollow bar member 3 to the outer circumference of the first insulation seal 8. Specifically, the first insulation seal 8 supports the first hollow bar member 3 in a rotatable manner and coaxially, maintaining the clearance 6 to the second hollow bar member 4. The first hollow member 3 is prevented from falling off since a cut-off portion on its inner circumference or inner enlarged portion 28 abuts against the end surface of the first insulation seal 8, The O-ring 27 is fitted in a groove 29 formed in the outer circumference of the first insulation seal 8 and prevents the ERF 11 filled between the bar members 3 and 4 from leaking. A dust seal 30 is provided between the first insulation seal 8 and the first hollow member 3.

Terminals 12, 13, 14 and 15 are attached to the ends of the bar members 3, 4, 5 and 2 respectively on one side to apply voltage to the ERF 11 loaded between each pair of bar members. The first terminal 12 is attached to the end of the first hollow member 3. The second terminal 13 is attached to the end of the second hollow member 4, running through the first insulation seal 8. The third terminal 14 is attached to the end of the third hollow member 5, running through the second insulation seal 9. The bolt 17 screwed into the end of the solid bar member 2 functions as the fourth terminal 15. The bolt 17 also serves as a fixture for a power-source plug, which will be installed at the end of the torsion bar 1 to supply voltage to the terminals 12, 13, 14 and 15.

Voltage is applied to the terminals 12, 13, 14 and 15 from a power circuit 31. The first terminal 12 is directly connected to the cathode of a power source 32. The second terminal 13 is connected to the anode of the power source 32 through a switch SW1. The third terminal 14 is connected to the cathode of the power source 32 through a second switch SW2. The fourth terminal 15 is connected to the anode of the power source 32 through a third switch SW3. In short, the terminals 12, 13, 14 and 15 are alternately connected to the anode and cathode of the power source 32. This is to avoid an unfavorable case where any two adjacent terminals have the same polarity (positive or negative) when all the switches SW1 to SW3 are turned on. Since the connection of the terminals 12–15 is parallel relative to the source 32, the same voltage (power source voltage) is applied to all the ERF 11.

In the following description, an operation of this invention with the aforementioned configuration will be described with reference to FIGS. 2 and 3.

When all the switches SW1, SW2 and SW3 are disengaged (Case #1), only the first hollow bar member 3 creates torsion. This is because all the ERF 11 remains liquid, as no voltage is applied, allowing the other bar members 2, 3, 4 and 5 to rotate freely relative to each other. Thus, the torsion of the first hollow member 3 is not transferred to the other members 4, 5 and 2. In other words, the torsion of the first hollow member 3 is canceled by the slipping motion between the member 3 and the first insulation seal 8, and is not transferred to the second hollow member 4. As a result, the total torsion spring constant is equal to that of the first hollow bar member 3 alone.

When the switch SW1 is engaged (Case #2), voltage is applied from the power source 32 to the ERF 11 between the first hollow member 3 and the second hollow member 4. Then, the viscosity of the fluid 11 increases and holds the members 3 and 4 together as a unit. Since the fluid 11 makes contact over an extensive area of the members 3 and 4, its holding force is extremely large. The torsion of the first member 3 is therefore transferred intact to the second member 4. In this case, accordingly, the total torsion spring constant becomes the sum of the torsion spring constants of the first and second members.

When the second switch SW2 is engaged in addition to the first switch SW1 (Case #3), voltage is applied from the power source 32 additionally to the ERF 11 between the second member 4 and the third member 5. As a result, the fluid holds the three members 3, 4 and 5 together as a unit. In this situation, no two adjacent members have the same polarity since the members 3, 4 and 5 are alternately connected to the anode and cathode of the power source 32. Also, since the members 3, 4 and 5 are connected in parallel to the power source 32, the same voltage is applied to each body of the ERF 11 and allows them to generate the same holding force. Consequently, the total torsion spring constant becomes the sum of those of the members 3, 4 and 5.

Likewise, when the third switch SW3 is engaged in addition to the first two switches SW1 and SW2 (Case #4), the ERF 11 holds the third hollow bar member 5 and the solid bar member 2 together as a unit. Consequently, the fluid 11 holds all the members 3, 4, 5 and 2 together as a unit. As a result, the total torsion spring constant of the bar 1 becomes the total of the torsion spring constants of all the hollow members 3, 4 and 5 and the solid member 2.

As described above, the total torsion spring constant (stiffness of the spring) can be changed over an extensive range and in a multiple-stage manner by engaging or disengaging the switches SW1, SW2 and SW3. The apparent characteristic of this invention is being compact: even through its diameter becomes larger a little, it can still be said compact since it does not need a large space. This makes it very easy to install the torsion bar of this invention in a vast range of applications, including in automobiles.

Further, since the spring constant is controlled by the on/off switching operation, this invention allows a greater degree of freedom in terms of equipment installation compared with the prior art arrangement which employs a cable to change the spring constant. Power cords require less consideration and care than mechanical cables to be pulled when they are arranged in place on an automobile. Also, the power cords less suffers from aging than the mechanical cable since the former does not move to change the spring constant whereas the latter must move. In addition, the torsion bar of this invention has high reliability and durability since it is of simple structure and depends on simple principles.

If variable resistors are placed between the terminals 12, 13, 14 and 15 and the power source 32, it is possible to control the applied voltage, thereby allowing some amount of slippage between pairs of the members 2, 3, 4 and 5 and it becomes possible to more finely control the variation of spring constant.

From a similar viewpoint, only one-third of the power-source voltage 32 is applied to each body of the ERF 11 when only the switch SW3 is engaged because voltage 32 is applied between the first hollow member 3 and the solid member 2. Therefore, all the members 2, 3, 4 and 5 are not completely held together as a unit, but are allowed to slip to some extent, and fine control of the variation of spring constant becomes possible.

[SAMPLE APPLICATION 1]

Figure 5:
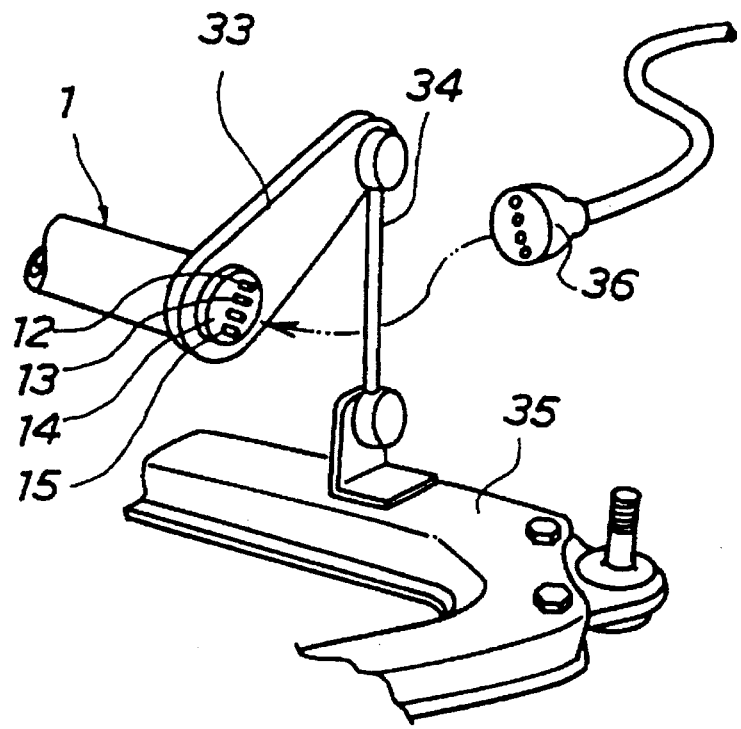
FIG. 5 is an enlarged view of the portion indicated by the broken-line circle in FIG. 4.

Shown in FIGS. 4 and 5 is an example of a torsion bar 1 with variable spring constant of this invention used as a stabilizer bar (antiroll bar) in an automobile. As indicated in the figures, arms 33 are engaged with splines 7 of the outermost hollow bar member 3 at both ends of the torsion bar 1. Each arm 33 is connected to a lower arm member 35 via a connecting rod 34. A power source plug 36 is connected to the terminals 12, 13, 14 and 15 at one end of the torsion bar 1 so as to supply power to the terminals.

In this configuration, the spring constant of the torsion bar 1 is variable by controlling the voltage applied to the terminals 12, 13, 14 and 15. So, the anti-roll rigidity or stiffness of the automobile can become variable as well. For instance, making the roll stiffness relatively lower when the car is running straight or at a lower speed ensures comfortable driving (driving with a softer suspension). On the other hand, making the roll stiffness higher when the car is cornering or cruising at a higher speed realizes both steady steering and comfort of ride simultaneously. This enables high-level tuning.

In addition, oversteer and understeer can be freely controlled if the torsion bar 1 of this invention is used in stabilizer bars for the front and rear axles, because the roll stiffness of the front and rear axles can be changed arbitrarily. Specifically, oversteer occurs when the roll stiffness of the front axle is reduced and that of the rear axle is raised. On the contrary, understeer becomes apparent when the roll stiffness of the front axle is raised and that of the rear axle is reduced.

[SAMPLE APPLICATION 2]

Figure 6:
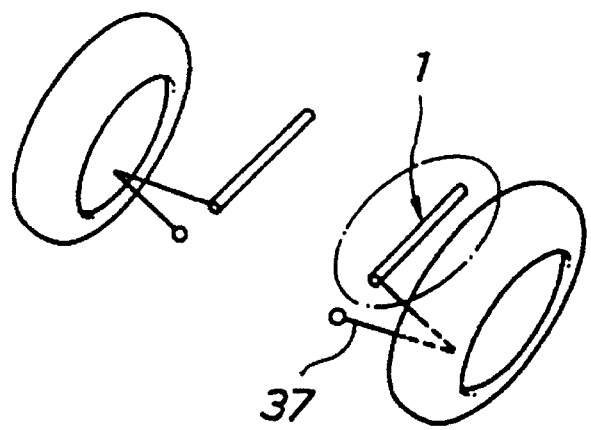
FIG. 6 is an illustration of the torsion bar used as a torsion spring.

Shown in FIGS. 6 and 7 is an example of the torsion bar 1 with variable spring constant of this invention used as a torsion spring in an automobile suspension. As indicated in the figures, one end of the torsion bar 1 is fixed to a lower arm 37 and the other end is fixed to a body frame (not indicated in the figures). Specifically, a female spline 38 is engaged over the spline 7 of the first hollow bar member 3. The lower arm 37 is fixed to the female spline 38 by a bolt 39. A bracket 40 is engaged over the spline 7 at the other end of the torsion bar 1. The bracket 40 is mounted on the body frame. A power-source plug 41 is connected to one end of the torsion bar 1 to supply power to the terminals 12, 13, 14 and 15.

In this configuration, the rotation of the lower arm 37 provides torsion (twisting motion) to the torsion bar 1 (see FIG. 8). The spring rate of the suspension can become variable by controlling the voltage applied to the terminals 12, 13, 14 and 15 because the spring constant of the torsion bar 1 becomes variable. It should be noted that since the torsion bar 1 is already twisted slightly by gravity (when angle of torsion=1G), the torsion angle of the torsion bar 1 is reduced and the height of the automobile is increased if the spring rate of the suspension is increased. On the other hand, the height of the automobile is decreased if the spring rate is reduced. To deal with such a phenomenon, the relative position of the lower arm 37 to the body frame is adapted to be vertically changeable so that it is raised in order to maintain the car position when the spring rate is increased, and it is lowered when the spring rate is decreased. Conversely, this can provide the following effects.

Conventional height-adjustment systems usually change the vertical position of the lower arm 37. When the height of car is increased, i.e., when the mounting position of the lower arm 37 is raised, therefore, only the bump stroke (clearance between a suspension and a bump stopper) is reduced and the spring rate remains the same. Since the energy-absorbing capacity of the suspension is determined by the spring rate and bump stroke, the suspension does not give a comfortable ride, as it "easily bottoms out" in this case. To eliminate this problem, the spring rate is raised in the present invention as described above (see FIG. 9). As illustrated in FIG. 9, it should be noted that the start point of the new load-torsion angle line is shifted right from a zero point and its inclination becomes steeper but its 1G point remains unchanged: the load-torsion angle line of the normal torsion bar (two-dash line) and the new load-torsion angle line (solid line) intersect at the 1G point. This means that the torsion bar of the present invention provides the same car height and the same energy-absorbing capacity as a normal arrangement. Hence, the car gives a more level ride preventing "bottoming out". The higher spring rate of the suspension results in a stiffer ride but insures steadier maneuverability.

Figure 10:
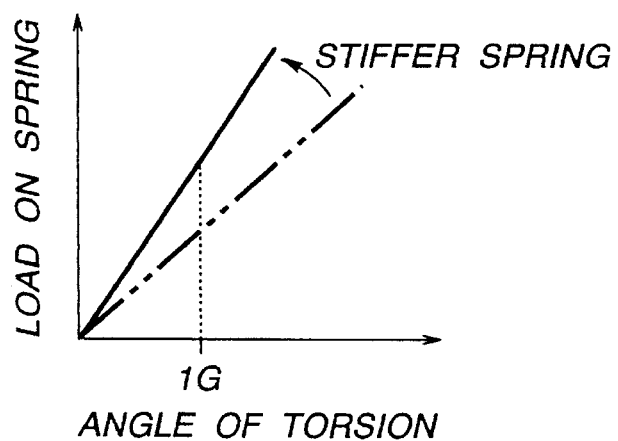
FIG. 10 is a chart showing how the spring constant of a normal or conventionla torsion bar is ncreased by a conventional technique.

Generally or conventionally, whether the spring becomes stiffer or not is determined by the inclination of the load-torsion angle line having a start point always at 0, as shown in FIG. 10. Specifically, making the spring stiffer means only making the inclination of the line steeper as indicated by the arrow. The start point of the steeper line is still zero. Therefore, the technical concept taught in the present invention regarding change of the spring constant of a torsion bar by means of applying voltage is quite different from the general method.

[EXPERIMENTS]

Figure 11:
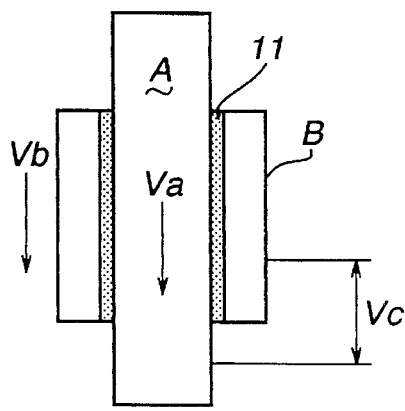
FIG. 11 is an illustration useful to explain a basic experiment on ERF.
Figure 12:
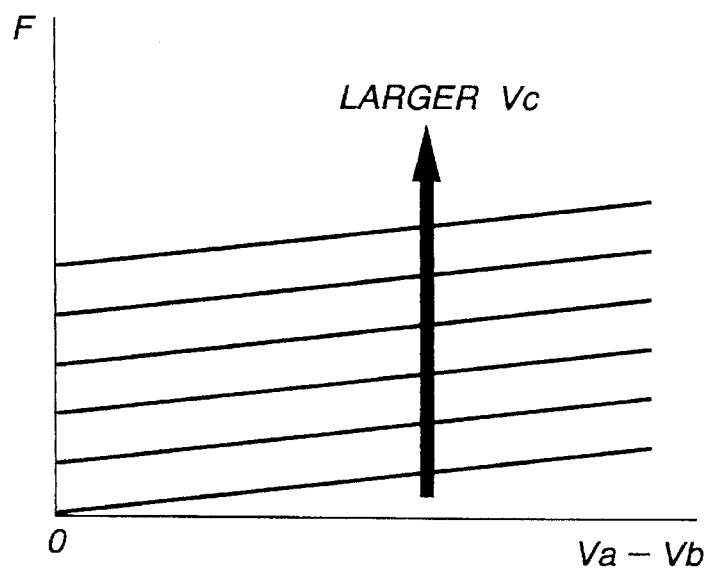
FIG. 12 is a chart showing the results of the basic experiment of FIG. 11.
Figure 13:
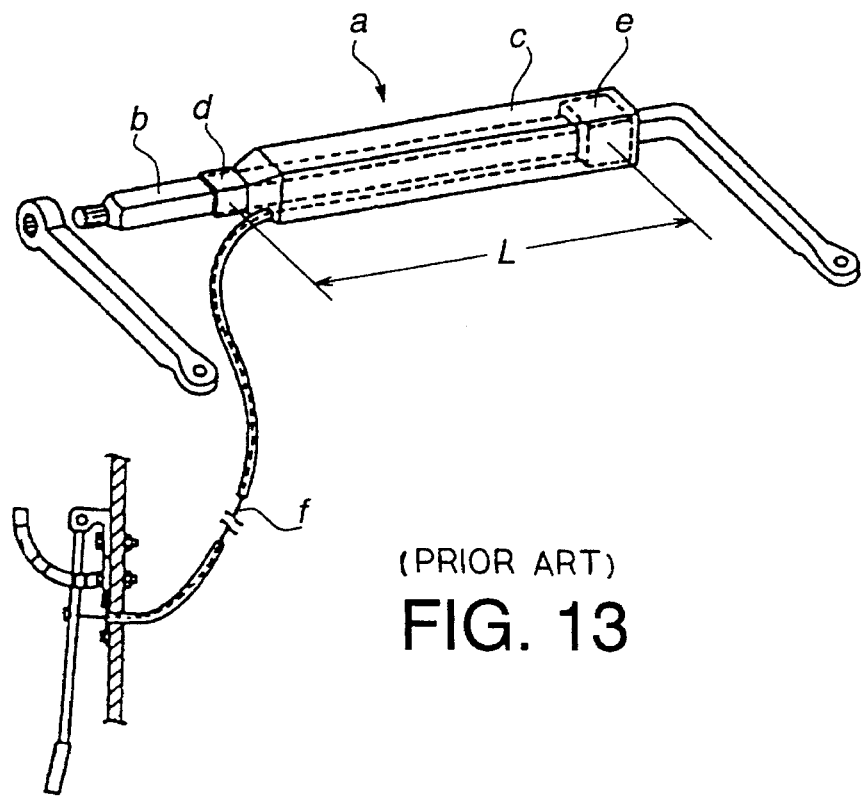
FIG. 13 shows a conventional torsion bar with variable spring constant.
Figure 14:
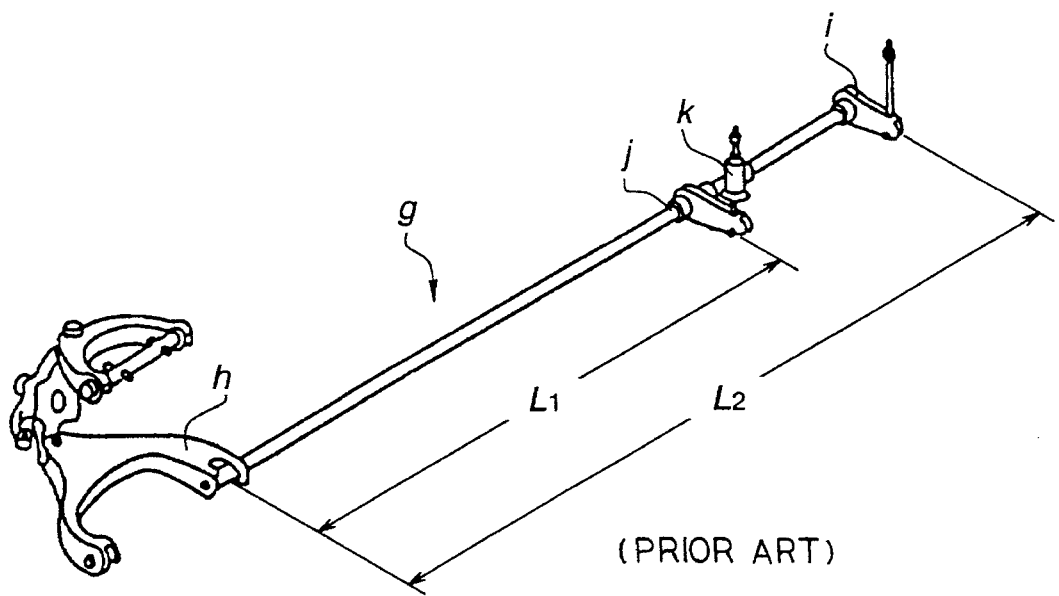
FIG. 14 shows another conventional torsion bar with variable spring constant.

FIGS. 11 and 12 show an experiment to prove that any two adjacent bar members can be held together as a unit by the ERF 11 when a certain voltage is applied to the fluid 11. In the experiment, as shown in FIG. 11, the ERF 11 was loaded into the clearance between a rod A and a cylinder B and voltage Vc was applied between the rod A and the cylinder B. Relationship between Va-Vb (the speed difference between the speed Va of the rod A and the speed Vb of the cylinder B) and a force F generated between the rod A and the cylinder B was studied. The applied voltage Vc was used a parameter.

As a result of the experiment, it was found that a certain force F was generated if the voltage Vc was increased even when the speed difference between Va and vb was zero or the rod A and the cylinder B were completely held together as a unit. This means that the rod A and the cylinder B can be fixed relative to each other in the circumferential and axial directions if the voltage Vc exceeds a certain level. It was also learned that this occurred very quickly: the rod A and the cylinder B could be held together as a unit within 0.1 second after the voltage Vc was applied. Therefore, the aforementioned embodiment of this invention is quite feasible.

We claim:

1. A torsion bar with a variable spring constant comprising:
   a plurality of hollow torsion-bar members having different diameters and arranged coaxially;
   electrorheological fluid loaded in a clearance between each two adjacent hollow torsion-bar members and capable of increasing its viscosity upon application of a predetermined voltage to hold a desired pair of said adjacent torsion-bar members together as a unit; and
   electric terminals installed at one end of each hollow torsion-bar member to apply voltage to said electrorheological fluid.

2. The torsion bar with a variable spring constant of claim 1, wherein a spline is formed in a surface of an outermost hollow torsion-bar member for inputting torsion or twisting motion to the torsion bar.

3. The torsion bar with a variable spring constant of claim 1, wherein a power circuit is connected with the torsion bar in a manner such that positive and negative voltages are alternately applied to said electric terminals of said hollow torsion bar members in a bar-member-arranged order.

4. The torsion bar with a variable spring constant of claim 3, wherein said power circuit includes power cords connected to said electric terminals and a power source for supplying positive and negative voltage alternately to the torsion bar members in the bar-member-arranged order.

5. The torsion bar with a variable spring constant of claim 4, further including switches connected to said power cords for turning on and off said voltage applied to said electric terminals.

6. The torsion bar with a variable spring constant of claim 4, further including variable resistors connected to said power cords to allow adjacent torsion-bar members to slightly rotate relative to each other instead of completely holding the pair of said adjacent torsion-bar members together as a unit.

7. An automobile having a suspension stabilizer bar wherein said stabilizer bar comprises a plurality of hollow torsion-bar members having different diameters and arranged coaxially;
   electrorheological fluid loaded in a clearance between each two adjacent hollow torsion-bar members and capable of increasing its viscosity upon application of a predetermined voltage to hold a desired pair of said adjacent torsion-bar members together as a unit; and
   electric terminals installed at one end of each hollow torsion-bar member to apply voltage to said electrorheological fluid.

8. An automobile having a front and rear stabilizer bar wherein said front and rear stabilizer bar each comprise a plurality of hollow torsion-bar members having different diameters and arranged coaxially;
   electrorheological fluid loaded in a clearance between each two adjacent hollow torsion-bar members and capable of increasing its viscosity upon application of a predetermined voltage to hold a desired pair of said adjacent torsion-bar members together as a unit; and
   electric terminals installed at one end of each hollow torsion-bar member to apply voltage to said electrorheological fluid, the front and rear stabilizer bar to control oversteer and understeer characteristics of said automobile by changing spring constants of said front and rear stabilizer bars.

9. An automobile having a suspension torsion bar wherein said suspension torsion bar comprises a plurality of hollow torsion-bar members having different diameters and arranged coaxially;

electrorheological fluid loaded in a clearance between each two adjacent hollow torsion-bar members and capable of increasing its viscosity upon application of a predetermined voltage to hold a desired pair of said adjacent torsion-bar members together as a unit; and electric terminals installed at one end of each hollow torsion-bar member to apply voltage to said electrorheological fluid.

10. An automobile having a body and a torsion bar wherein the torsion bar includes a plurality of hollow torsion-bar members having different diameters and arranged coaxially;

electrorheological fluid loaded in a clearance between each two adjacent hollow torsion-bar members and capable of increasing its viscosity upon application of a predetermined voltage to hold a desired pair of said adjacent torsion-bar members together as a unit; and electric terminals installed at one end of each hollow torsion-bar member to apply voltage to said electrorheological fluid, the torsion bar being used as a suspension torsion bar and the spring constant of said suspension torsion bar is raised by lowering an installation position off said suspension torsion bar to the body.

* * * * *